United States Patent
Han (10) Patent No.: US 12,233,754 B2
(45) Date of Patent: Feb. 25, 2025

(54) VEHICLE AND CONTROL METHOD THEREOF

(71) Applicants: Hyundai Motor Company, Seoul (KR); Kia Corporation, Seoul (KR)

(72) Inventor: Seungsu Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 216 days.

(21) Appl. No.: 17/878,203

(22) Filed: Aug. 1, 2022

(65) Prior Publication Data

US 2023/0080898 A1     Mar. 16, 2023

(30) Foreign Application Priority Data

Sep. 14, 2021   (KR) .................... 10-2021-0122322

(51) Int. Cl.
| | |
|---|---|
| *B60N 2/02* | (2006.01) |
| *B60N 2/00* | (2006.01) |
| *G06T 7/60* | (2017.01) |
| *G06V 20/56* | (2022.01) |
| *G06V 40/10* | (2022.01) |

(52) U.S. Cl.
CPC ........... *B60N 2/0248* (2013.01); *B60N 2/002* (2013.01); *G06T 7/60* (2013.01); *G06V 20/56* (2022.01); *G06V 40/10* (2022.01); *B60N 2/0268* (2023.08); *G06T 2207/30196* (2013.01); *G06T 2207/30252* (2013.01); *G06V 2201/10* (2022.01)

(58) Field of Classification Search
CPC .... B60N 2/0248; B60N 2/002; B60N 2/0268; G06V 40/10; G06V 20/56; G06V 2201/10; G06T 7/60; G06T 2207/30196; G06T 2207/30252
See application file for complete search history.

(56) References Cited

U.S. PATENT DOCUMENTS

| | | | |
|---|---|---|---|
| 2012/0007401 A1* | 1/2012 | Hashimoto .......... | B60N 2/1814 297/344.13 |
| 2014/0270243 A1* | 9/2014 | Bennett ................. | A61B 5/742 381/86 |
| 2020/0276949 A1* | 9/2020 | Baudu ................. | B60N 2/0268 |
| 2021/0276501 A1* | 9/2021 | Li ....................... | B60N 2/0252 |

(Continued)

FOREIGN PATENT DOCUMENTS

| | | |
|---|---|---|
| KR | 10-2163437 B1 | 11/2019 |
| KR | 10-2153621 B1 | 6/2020 |

(Continued)

*Primary Examiner* — Naeem Taslim Alam
(74) *Attorney, Agent, or Firm* — Fox Rothschild LLP (57) ABSTRACT

Disclosed are a vehicle and a control method thereof. The vehicle includes a vehicle seat, a sensing device including a camera provided to obtain image data toward an outer lateral direction of a driver seat of the vehicle, a seat motor provided to implement a movement including at least one of folding, reclining, sliding and rotating of the vehicle seat, and a controller including a processor and a memory provided to process the image data, wherein the controller identifies height information of a driver based on processing of the image data, and identifies a getting-on position based on the height information of the driver and existing height information stored in the memory and controls the seat motor to shift the vehicle seat to the identified getting-on position.

18 Claims, 8 Drawing Sheets

(56) References Cited

U.S. PATENT DOCUMENTS

| | | | |
|---|---|---|---|
| 2022/0155605 A1* | 5/2022 | Lambert | B60N 2/0274 |
| 2023/0022208 A1* | 1/2023 | Bennie | B60W 10/30 |
| 2023/0073986 A1* | 3/2023 | Kuang | B60N 2/0252 |

FOREIGN PATENT DOCUMENTS

| | | |
|---|---|---|
| KR | 10-2167103 B1 | 8/2020 |
| KR | 10-2020-0108138 A | 9/2020 |

\* cited by examiner

VEHICLE AND CONTROL METHOD THEREOF

CROSS-REFERENCE TO RELATED APPLICATION(S)

This application is based on and claims under 35 U.S.C. § 119 the benefit of Korean Patent Application No. 10-2021-0122322, filed on Sep. 14, 2021, in the Korean Intellectual Property Office, the disclosure of which is incorporated by reference herein in its entirety.

TECHNICAL FIELD

The disclosure relates to a vehicle and a control method, and more particularly, to a vehicle capable of providing a seat memory system and a control method thereof.

BACKGROUND

In general, a vehicle is provided with a seat for comfort of a driver.

In addition, various electronic control systems are applied to a vehicle. Due to this, various devices and systems in a vehicle that were previously manually controlled are also being controlled electronically.

As an example, a seat position of a vehicle may also be controlled. While previously, a method of controlling the seat position by rotating or pulling a lever was used, recently, a method of electronically controlling the seat position has been used.

For example, when a vehicle is started, depending on conditions in getting on and off the vehicle, the seat position of the vehicle set by the driver may be automatically controlled.

A motor is required to electronically control the seat position of a vehicle. In addition, various sensors and control modules for controlling the motor may be required.

However, a conventional electronic control method of controlling the seat position may not distinguish between an intentional adjustment of the seat position of the driver and an unintentional adjustment of the seat position of the driver, and even in a situation in which the driver is changed, seat automatic control may be performed based on a final seat position, which causes inconvenience in that the driver has to separately perform a position manipulation again.

SUMMARY

It is an aspect of the disclosure to provide a vehicle and a control method thereof capable of adjusting a seat position in consideration of the body type of a driver, and identifying seat positions in getting on and off by determining whether the adjustment of seat position matches an intention of the driver.

Additional aspects of the disclosure will be set forth in part in the description which follows and, in part, will be obvious from the description, or may be learned by practice of the disclosure.

In accordance with an aspect of the disclosure, a vehicle includes a vehicle seat, a sensing device including a camera provided to obtain image data toward an outer lateral direction of a driver seat of the vehicle, a seat motor provided to implement a movement including at least one of folding, reclining, sliding and rotating of the vehicle seat, and a controller including a processor and a memory provided to process the image data, wherein the controller identifies height information of a driver based on processing of the image data, and identifies a getting-on position based on the height information of the driver and existing height information stored in the memory and controls the seat motor to shift the vehicle seat to the identified getting-on position.

In some embodiments, the controller may be configured to identify a getting-off position based on the identified getting-on position and the height information of the driver and control the seat motor to shift the vehicle seat to the identified getting-off position.

In some embodiments, the identifying of the getting-off position may include calculating a getting-off distance based on the height information of the driver and identifying the getting-off position based on the getting-off distance and the identified getting-on position.

In some embodiments, the sensing device may further include a sensor provided to detect whether the driver is seated on the vehicle seat, and the controller may control the seat motor to shift the vehicle seat to the identified getting-on position when it is identified that the driver is seated on the vehicle seat.

In some embodiments, the vehicle may further include an input device provided to adjust the position of the vehicle seat, wherein the sensing device may further generate position data including the position of the vehicle seat, and the controller, when a position manipulation of the vehicle seat is received from the input device, may determine whether to identify the position of the vehicle seat as the getting-on position based on the position data of the vehicle seat depending on the position manipulation and existing getting-on positions stored in the memory.

In some embodiments, the controller may be configured to identify the position of the vehicle seat as the getting-on position in response to a case where a difference between an average value of the existing getting-on positions stored in the memory and the position of the vehicle seat is smaller than the getting-off distance.

In some embodiments, the controller may be configured to determine whether to identify the position of the vehicle seat as the getting-on position based on whether the vehicle corresponds to a driver getting-off condition in response to a case where a difference between an average value of the existing getting-on positions stored in the memory and the position of the vehicle seat is larger than the getting-off distance.

In some embodiments, the controller may be configured to identify the existing getting-on position as the getting-on position in response to the vehicle corresponding to the driver getting-off condition.

In some embodiments, the controller may be configured to identify drivers getting on the vehicle based on the processing of the image data, and store height information and the identified getting-on position for each of the identified drivers.

In some embodiments, the controller may be configured to generate the getting-on positions as metadata for time depending on the identified drivers.

In accordance with an aspect of the disclosure, a vehicle control method includes obtaining image data toward an outer lateral direction of a driver seat of a vehicle by a camera, identifying height information of a driver based on processing of the image data, identifying a getting-on position based on the height information of the driver and existing height information stored in the memory, and controlling a seat motor to shift a vehicle seat to the identified getting-on position.

As discussed, the method and system suitably include use of a controller or processor.

In another embodiment, vehicles are provided that comprise an apparatus as disclosed herein.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numbers refer to like elements throughout this specification. This specification does not describe all components of the embodiments, and general contents in the technical field to which the disclosure belongs or overlapping contents between the embodiments will not be described.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

When it is described that a part "includes" an element, it means that the element may further include other elements, not excluding the other elements unless specifically stated otherwise.

The singular expressions herein may include plural expressions, unless the context clearly dictates otherwise.

In addition, terms such as "~unit", "~part," "~block," "~member," and "~module" may denote a unit for processing at least one function or operation. For example, the terms may refer to at least one hardware such as a field-programmable gate array (FPGA)/an application specific integrated circuit (ASIC), at least one software stored in a memory, or at least one process processed by a processor.

In each step, an identification numeral is used for convenience of explanation, the identification numeral does not describe the order of the steps, and each step may be performed differently from the order specified unless the context clearly states a particular order.

The terms 'first,' 'second,' etc. are used to distinguish one element from another element, and the elements are not limited by the above-mentioned terms.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, a vehicle and a control method thereof according to an embodiment will be described in detail with reference to the accompanying drawings.

Figure 1:
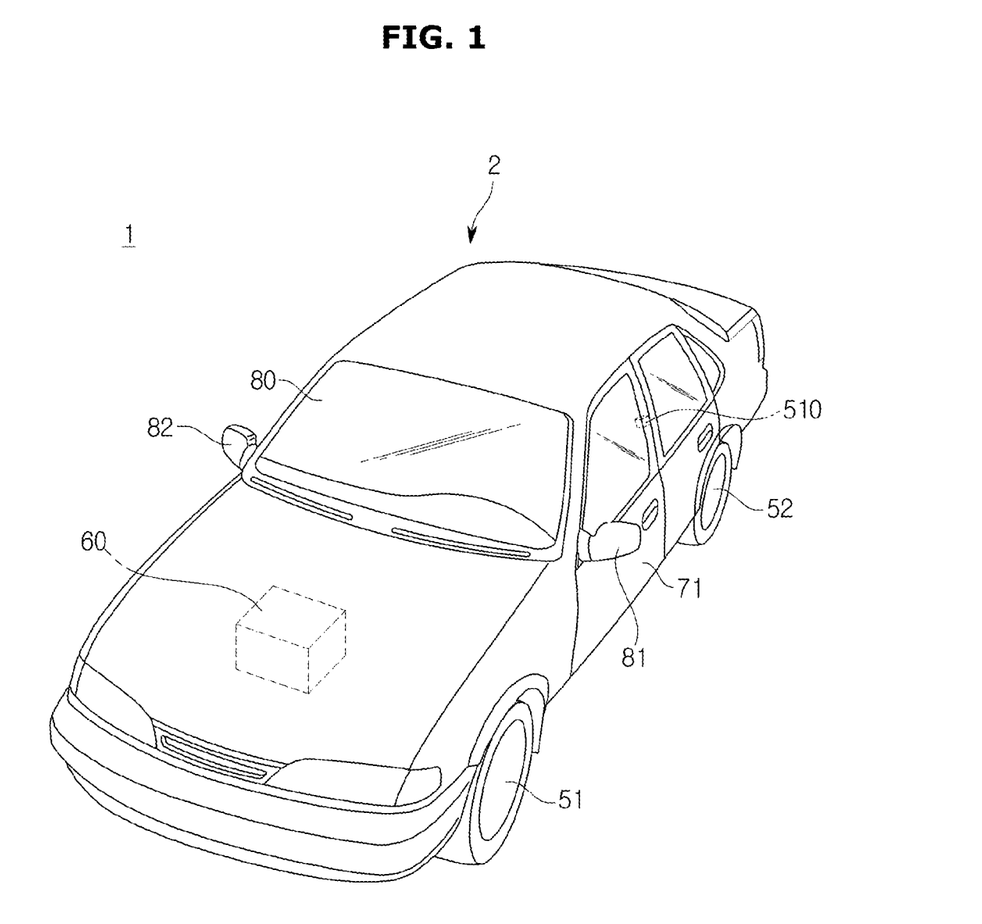
FIG. 1 is a conceptual diagram of a vehicle according to an embodiment.

FIG. 1 is a conceptual diagram of a vehicle according to an embodiment.

Referring to FIG. 1, a vehicle 1 according to an embodiment of the disclosure may include a main body 2 forming an outer appearance of vehicle 1, wheels 51 and 52 provided to move the vehicle 1, a drive device 60 provided to rotate the wheels 51 and 52, doors 71 and 72 provided to shield the inside of the vehicle 1 from the outside, a front windscreen 80 provided to provide a field of view of the front of the vehicle 1 to a driver, and side mirrors 81 and 82 and a camera 510 provided to provide a field of view of a lateral-rear of the vehicle 1 to the driver.

The wheels 51 and 52 may include the front wheel 51 provided at the front of the vehicle 1 and the rear wheel 52 provided at the rear of the vehicle 1, and the drive device 60 may provide a rotational force to the front wheel 51 or the rear wheel 52 so that the main body 2 moves forward or rearward. The drive device 60 may employ an engine that burns fossil fuel to generate a rotational force or a motor that generates a rotational force by receiving power from an engine or a capacitor (not shown).

The doors 71 and 72 may be rotatably provided on the left and right sides of the main body 2 to allow the driver to get the vehicle 1 on when opened and to shield the inside of the vehicle 1 from the outside when closed.

The windscreen 80 may be provided at a front upper side of the main body 2 so that the driver inside the vehicle 1 may obtain information on the field of view of the front of the vehicle 1.

The side mirrors 81 and 82 may include a left side mirror 81 provided on the left side of the main body 2 and a right side mirror 82 provided on the right side, and allow the driver inside the vehicle 1 to obtain information on the field of view of the lateral-rear of the vehicle 1.

Figure 2:
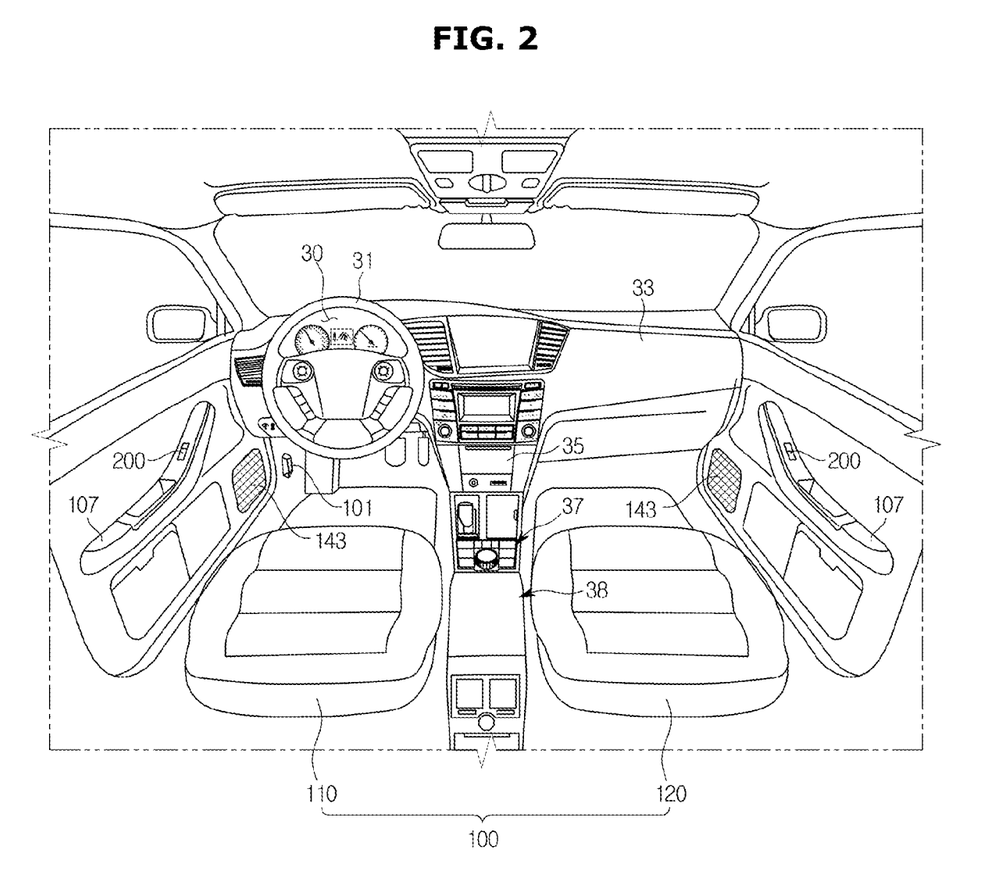
FIG. 2 is a conceptual diagram illustrating inner components of the vehicle according to an embodiment.

FIG. 2 is a conceptual diagram illustrating inner components of the vehicle according to an embodiment.

Referring to FIG. 2, inside the vehicle 1, a vehicle seat 100 on which the driver is seated, a dashboard 33, an instrument panel (that is, a cluster 30) disposed on the dashboard 33 and provided with a tachometer, a speedometer, a coolant thermometer, a fuel gauge, turn signal lights, high beam indicator lights, warning lights, a seat belt warning light, an odometer, a trechometer, an automatic shift selector indicator light, door open warning lights, an engine oil warning light, and a low fuel warning light, a steering wheel 31 provided to manipulate a direction of the vehicle 1, and a center fascia 35 in which an air vent and adjustment plate of an air conditioner and an audio device are disposed are provided.

The cluster 30 may be implemented digitally. That is, the digital cluster 30 displays vehicle information and driving information as images.

The center fascia 35, which is a part located between a driver seat 110 and a passenger seat 120 on the dashboard 33, may include a head unit for controlling the audio device, the air conditioner, and a heater. In the center fascia 35, the air vent, a cigar jack, etc. may be installed.

A center console 37 may be provided with a jog shuttle type or a hard key type center input device. The center console 37 is positioned between the driver seat 110 and the passenger seat 120 such that a gear operation lever and a tray 38 are provided. The center input device may perform all or some functions of an AVN device.

The vehicle seat 100 may include the driver seat 110 on which the driver is seated, the passenger seat 120 on which a passenger is seated, and rear seats (not shown) disposed at the rear of the vehicle 1.

Input devices 200 provided to adjust a position of the vehicle seat 100 may be provided on armrests 107 located on opposite sides of the vehicle seat 100 and coupled to the doors 71 and 72 of the vehicle 1. However, the disclosure is not limited thereto. For example, the input devices 200 may be located on side surfaces of the vehicle seat 100.

The input device 200 may be a button for adjusting a position of each component of the vehicle seat 100 or adjusting the position of the vehicle seat 100, which will be described below, and may be provided in various forms, such as a lever, a jog shuttle type, and a hard key type. A detailed description of the vehicle seat 100 will be provided later with reference to FIG. 3.

The inside of the vehicle 1 illustrated in FIG. 2 is only an example of the disclosure, may be provided with various components or other electronic devices, and is not limited to the above.

Figure 3:
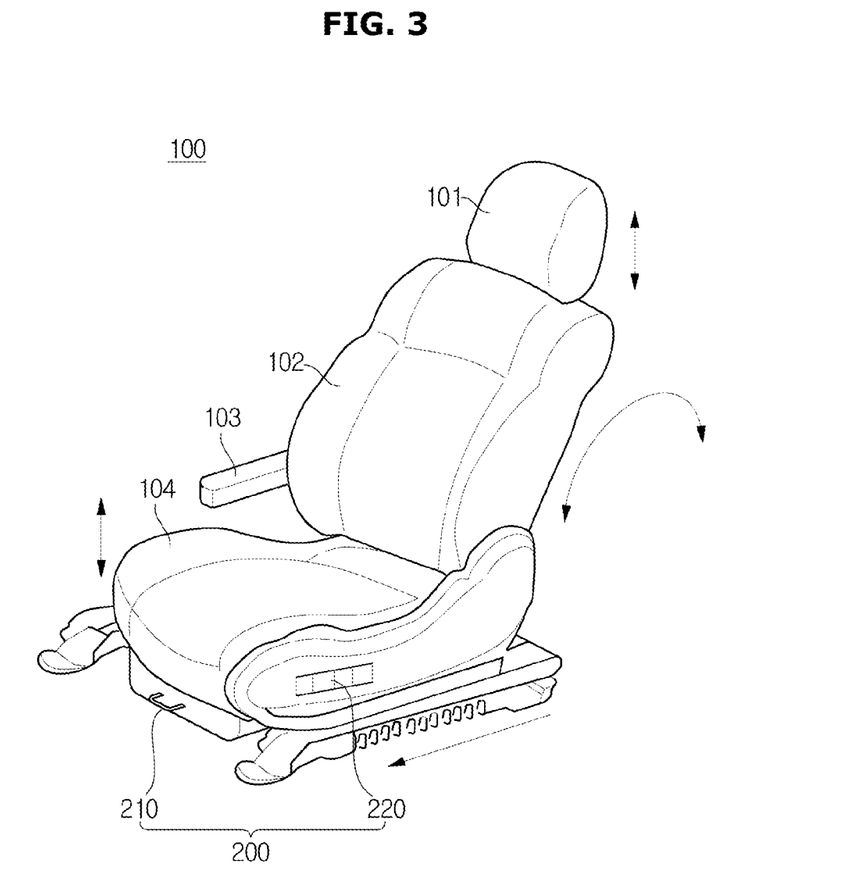
FIG. 3 is a conceptual diagram illustrating components of a vehicle seat according to an embodiment.

FIG. 3 is a conceptual diagram illustrating components of a vehicle seat according to an embodiment.

Referring to FIG. 3, the vehicle seat 100 may include a headrest 101 provided to support a head of the driver of vehicle 1, a seat back 102 provided to support a back of the driver, an armrest 103 provided to support an arm of the driver, a seat cushion 104 on which the driver is seated, and the input device 200 provided to adjust the position of each component of the vehicle seat 100.

The headrest 101, which is a kind of cushion for supporting the head of the driver, may be provided in various forms.

The headrest 101 of the disclosure may be adjusted to a position desired by the driver. For example, the headrest 101 may be adjusted in a front-rear direction of the vehicle 1 and may also be adjusted in height.

In the disclosure, the driver does not control the input device 200, and when a controller 300 detects that the driver is seated, the headrest 101 may be automatically adjusted, and there is no limitation.

The seat back 102, which is a kind of cushion for supporting the back of the driver, may be provided in various forms.

The seat back 102 of the disclosure may be adjusted to a position desired by the driver, that is, in the front-rear direction of the vehicle 1. Specifically, the seat back 102 may be inclined at various angles.

The armrest 103, which is a component of the vehicle seat 100 that supports the arm of the driver, may be adjusted by a rotor between the seat back 102 and the seat cushion 104.

The armrest 103 may have various shapes and lengths, and there is no limitation. Also, the armrest 103 may be omitted and may be replaced with the armrest 107 in the inside of the vehicle 1 described above.

The armrest 103 may be adjusted to a position desired by the driver. For example, the headrest 101 may be adjusted in a direction parallel to the seat back 102, and may also be inclined at various angles. In addition, in the disclosure, the driver does not control the input device 200, and when the controller 300 detects that the driver is seated, the armrest 103 may be automatically adjusted, and there is no limitation.

The seat cushion 104 is connected to a lower end of the seat back 102, and may be formed in a hexahedral shape to extend toward the front of the vehicle 1. The seat cushion 104 may be provided in various forms, any form is possible as long as the driver may sit, and there is no limitation.

The seat cushion 104 may move in up-down and front-rear directions of the vehicle 1 to suit a physical condition of the driver, and may be adjusted depending on the control of the input device 200.

The input device 200 may be an operation button for the driver to adjust the position of each component of vehicle seat 100 as described above.

The input device 200 of FIG. 3 may include a lever 210 provided to adjust sliding of the vehicle seat 100, that is, the entire components of the vehicle seat 100 to the front and rear of the vehicle 1, and a button 220 provided to adjust the position of each component of the vehicle seat 100. However, the disclosure is not limited thereto. As another embodiment, the lever 210 may be omitted when the entire components of the vehicle seat 100 are adjusted to the front and rear of the vehicle 1 depending on the control input to the input device 200.

The button 220 may be a button for controlling each of the headrest 101, the seat back 102, the armrest 103, and the seat cushion 104 as described above, and the driver may control the position of each component of the vehicle seat 100 by using each button.

The inside of the vehicle seat 100 illustrated in FIG. 3 is only an example of the disclosure, and each component of the vehicle seat 100 may be various and may include different shapes. The position and shape of the input device 200 may also be various and there is no limitation.

Figure 4:
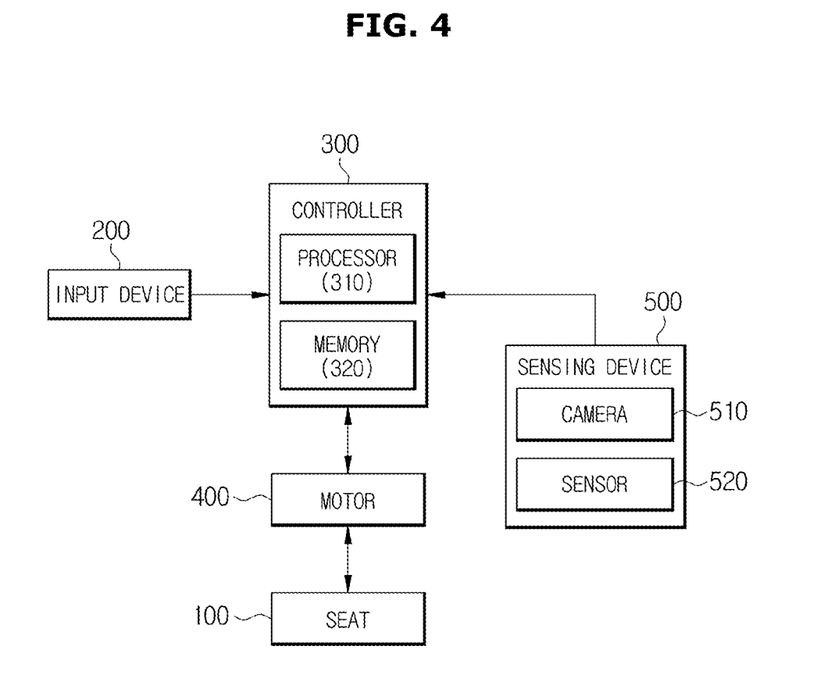
FIG. 4 is a block diagram illustrating components of the vehicle according to an embodiment.

FIG. 4 is a block diagram illustrating components of the vehicle according to an embodiment.

Referring to FIG. 4, the vehicle 1 may include the input device 200 provided to receive an input signal for adjusting the position of the vehicle seat 100 and transmit the received input signal to the controller 300, a seat motor 400 provided to move the position of the vehicle seat 100, a sensing device 500 including a camera 510 and a sensor 520 provided to obtain image data toward an outer lateral direction of the driver seat 110 of the vehicle 1, and the controller 300 including a processor 310 provided to process data and a memory 320 provided to store data and data processing results, and generating a control signal for controlling the seat motor 400.

The input device 200 refers to a device that receives an input signal for controlling the position of the vehicle seat 100 by the driver.

As described above, the input device 200 is provided at a predetermined position of the interior of the vehicle 1 or of the vehicle seat 100, and may include various types. For example, the input device 200 may be provided as a lever, a jog shuttle type, or a hard key type. The input device 200 may also include various types of electronic devices capable of automatically controlling the vehicle seat 100 and the position of each component of the vehicle seat 100 through the sensor 520 when the driver is seated.

The seat motor 400 provided to control the position of the vehicle seat 100 may be provided inside the vehicle 1 or within the vehicle seat 100. As an example, the seat motor 400 may be a sensorless brushless DC motor.

Specifically, the BLDC motor may include a rotor made of a magnet or a magnetic material, and refers to a DC (direct current) motor using a characteristic in which a rotor rotates as a stator generates a magnetic field while rotating. Therefore, the BLDC motor does not require a separate driver to drive the motor.

The controller 300 according to the disclosure may control a power supply (not shown) installed inside the vehicle 1 in response to a signal from the input device 200. Accordingly, the power supply applies input power for driving the seat motor 400, thereby rotating the seat motor 400.

The seat motor 400 may implement a movement including at least one of folding, reclining, sliding and rotating of the vehicle seat 100. However, the disclosure is not limited thereto, and movements of components included in the vehicle seat 100 may be implemented. As an example, the seat motor 400 truly implement a movement to the front and/or rear of the vehicle seat 100 depending on a position control of the vehicle seat 100 of the driver from the input device 200, and may implement a movement to the front and/or rear of the vehicle seat 100 depending on a position control signal received from the controller 300.

In order to control the position of the vehicle seat 100, the position of the vehicle seat 100 needs to be detected first. In general, in order to detect the position of the vehicle seat 100, the separate sensor 520 such as a hall sensor may be provided. However, the disclosure is not limited thereto. As another embodiment, the sensor 520 is not an additional sensor, for example, may refer to a device (not shown) that senses the position of the vehicle seat 100 through a current flowing in the seat motor 400. That is, the sensor 520 may refer to a conventionally known sensor and/or device capable of identifying the position of the vehicle seat 100, and a sensor and/or device capable of identifying the position of the vehicle seat 100, which will be developed in the future, may also be applied.

The sensor 520 may also include, for example, a sensor to detect whether the driver is seated on the driver seat 110. That is, the sensor 520 may generate position data including the position of the vehicle seat 100, and may detect whether the driver is seated on the driver seat 110.

The camera 510 may be installed to have a field of view of an outer side of the driver seat 110 of the vehicle 1 to photograph the side of the driver seat 110 of the vehicle 1, thereby obtaining image data of the side of the driver seat 110 of the vehicle 1. The camera 510 is also installed to have a field of view of a side of the passenger seat 120 of the vehicle 1 to photograph the side of the passenger seat 120 of the vehicle 1, thereby obtaining image data of the side of the passenger seat 120 of the vehicle 1. However, the disclosure is not limited thereto. As another embodiment, the camera 510 may include, for example, at least one of the first camera for obtaining side direction image data of the driver seat 110 and the second camera for obtaining side direction image data of the passenger seat 120.

The image data may include information about various objects on the side of the vehicle 1. The objects may include, for example, people, buildings, vehicles, horizons, street lamps, roadside trees, etc., and are not limited thereto.

The camera 510 may include a plurality of lenses and an image sensor. The image sensor may include a plurality of photo diodes to convert light into an electric signal, and the plurality of photo diodes may be arranged in a two-dimensional matrix.

More specifically, the camera 510 may include a graphic processor to process image data, and thus may distinguish between the objects included in the image data based on the processing of the obtained image data. For example, the camera 510 may recognize the driver or a person approaching from a side direction of the driver seat 110 and recognize a face of a person by processing the image data.

The camera 510 may be electrically connected to the controller 300. For example, the camera 510 may be connected to the controller 300 through a vehicle communication network NT, or may be with the controller 300 through a hard wire. The front camera 510 may transmit the image data of an outer side of the driver seat 110 or passenger seat 120 of the vehicle 1 to the controller 300.

The controller 300 may process the image data received from the camera 510 and may identify another vehicle or a pedestrian or a cyclist or a lane (marker distinguishing between lanes) or a free space, that is located on a side of the vehicle 1, from the image data. In particular, the controller 300 may identify a person approaching from an outer direction of the main body 2 of the vehicle 1 based on the processing of image data. The controller 300 may also recognize the face of the approaching person based on the processing of the image data and may calculate height information of the person. However, the disclosure is not limited thereto.

Recognizing the face of a person based on the processing of the image data may be, for example, determining whether the approaching person is the driver by input of the image data through the facial recognition algorithm learned through an artificial neural network. However, the disclosure is not limited thereto. As another embodiment, the controller 300 may, based on the image data, perform a facial recognition of a person by applying a facial recognition program developed previously, or by applying a facial recognition program to be developed in the future.

The controller 300 may include the processor 310 and the memory 320.

The processor 310 may process image data received from the camera 510 and sensing data received from the sensor 520, and may output a control signal for controlling the drive device 60, the vehicle seat 100, and the like. For example, the processor 310 may include an image processor, a digital signal processor (DSP), and/or a micro control unit (MCU).

The processor 310 may identify objects around the vehicle 1 (e.g., another vehicle, a pedestrian, a cyclist, etc.), a lane on a road, and a free space based on the image data received from the camera 510.

The processor 310 may, based on the image data, identify relative positions (distance from the vehicle and angle to the driving direction) and classification (e.g., whether the object is another vehicle, a pedestrian, or a cyclist, etc.) of lateral objects of the vehicle 1. The processor 310 may also perform facial recognition when the identified lateral object is a person based on the image data to identify whether the person is a registered driver. The processor 310 may also identify a distance between the identified lateral object and the camera 510.

The processor 310 may recognize a person and identify height information of the recognized person, based on the processing of the image data received from the camera 510. More specifically, the processor 310 may identify a lateral object (a person) and identify a distance between the lateral object and the camera 510, based on the processing of the image data received from the camera 510. The processor 310 may also perform face recognition of the lateral object to calculate angle information to a position where the face of the lateral object is recognized with respect to the same plane as a vertical height of the camera 510 from the ground.

In summary, the processor 310 may recognize a person, which is the lateral object, based on the image data and may calculate angle information between the face of the person and the same plane as the vertical height of the camera 510 from the around. Accordingly, the processor 310 may calculate height information of the person based on the angle information and the distance to the person.

The vehicle 1 may further include touch sensors provided on handles attached to the doors 71 and 72. That is, the sensor 520 may further include touch sensors provided on the handles of the doors 71 and 72 of the vehicle 1 to detect a human touch.

Accordingly, the processor 310 may generate a control signal for controlling image data obtainment of the camera 510 when a human touch is recognized on the handle of the door 71 or 72 of the vehicle 1, thereby minimizing the power normally consumed by the camera 510. However, the disclosure is not limited thereto.

The processor 310 may calculate height information of driver based on the processing of the image data received from the camera 510 and identify a getting-on position based on the height information of driver and height information of driver previously stored in the memory. Herein, the getting-on position may refer to, for example, the position of the vehicle seat 100 when the driver gets on the vehicle 1 and the vehicle 1 travels. In addition, the getting-off position, which will be described later, may refer to, for example, a position in which the vehicle seat 100 is shifted to the rear for convenience of getting off of the driver when the driver gets off the vehicle 1. However, the disclosure is not limited thereto.

More specifically, because the height information of the driver might be stored in the memory 320 if the driver got on the vehicle in the past, the processor 310 may know that the most recently identified height information of the driver based on the present may be the height information of the driver previously stored in the memory.

Accordingly, the processor 310 may determine necessity of adjusting the getting-on position of the driver by comparing the most recently identified height information of the driver based on the present, height information of the driver identified based on the processing of image data currently received from the camera 510, and the previously stored height information of driver, and may readjust the getting-on position depending on the necessity. However, the disclosure is not limited thereto. This may, for example, be to readjust an optimized getting-on position of the driver depending on a heel height of a shoe of the driver and be to adjust the getting-on position suitable for a changed driver when the driver changes.

The processor 310 may also identify the getting-off position based on the identified getting-on position and the height information of the driver.

More specifically, the processor 310 may calculate a getting-off distance based on the height information of the driver and identify the getting-off position based on the getting-off distance and the getting-on position. That is, because, for example, more adaptive convenience to the driver may be provided by a change in the getting-off distance depending on the height information of the driver, it may be understood that the larger the height of the driver, the larger the getting-off distance may be proportionally increased.

When a control signal for manipulating the position of the vehicle seat 100 is received from the input device 200, the processor 310 may receive the position data including the position of the vehicle seat 100 depending on a position manipulation from the sensor 520.

Also, when the control signal for manipulating the position of the vehicle seat 100 is received from the input device 200, the processor 310 may determine whether to identify the position of the vehicle seat 100 shifted depending on the position manipulation received from the input device 200 as the getting-on position, based on the received position data including the position of the vehicle seat 100 and the previously stored getting-on positions. Herein, the previously stored getting-on positions may include, for example, records of getting-on positions before the driver manipulates the position of the vehicle seat 100 through the input device 200 and getting-on positions of the driver who has got on the vehicle 1 in the past. Because this is described assuming that there is only one driver of the vehicle 1, when there is a plurality of drivers of the vehicle 1, d may refer to past getting-on position records identified for each driver distinguished through a variety of height information of drivers or facial recognition. That is, when there is a plurality of drivers, it may be understood that the previously stored getting-on positions may include getting-on position records identified as each driver got on the vehicle 1 in the past.

Determining whether the processor 310 identifies the shifted position of the vehicle seat 100 as the getting-on position may be made by, for example, when the position of the vehicle seat 100 is manipulated through the input device 200 of the driver, determining whether the manipulation is performed by an intention of the driver.

The processor 310 may also identify the position of the vehicle seat 100 shifted by the manipulation inputted to the input device 200 as the getting-on position, further based on a getting-off condition of vehicle 1.

The memory 320 may store a program and/or data for the processor 310 to process the image data, a program and/or data for the processor 310 to process the sensing data, and a program and/or data for the processor 310 to generate a driving signal and/or a braking signal and/or a steering signal.

The memory 320 may store the image data received from the camera 510 and/or the sensing data received from the sensor 520, and may store the processing result of the image data and/or radar data of the processor 310.

The memory 320 may include not only a volatile memory such as S-RAM and D-RAM, but also a non-volatile memory such as flash memory, read-only memory (ROM), and erasable programmable read-only memory (EPROM).

That is, the memory 320 may store the result of data processing by the processor 310, and may transmit the stored data processing result to the processor 310 in response to a request of the processor 310.

More specifically, the memory 320 may store the getting-on position and the getting-off position identified based on the height information of the driver as well as the height information of the driver identified by the processor 310. The memory 320 may also store the height information and the identified getting-on position for each driver depending on the identified drivers.

In addition, the memory 320 may generate and store driver-specific metadata regarding the getting-on position and height information for each driver according to the passage of time depending on the identified drivers. Based on this, the processor 310 recognizes an object approaching from a side of the vehicle 1 as a person and identifies as a driver, and may access a past getting-on position history, a past getting-off position history, and a past height information history based on the metadata generated for each driver.

As such, the controller 300 may generate a control signal for moving a position of the seat motor 400 to the identified getting-on position or getting-off position based on the image data received from the camera 510 and/or the sensing data received from the sensor 520.

Hereinafter, with reference to the drawings, the vehicle 1 according to an embodiment will describe in detail the calculation of height information of the driver and identification of the getting-on position and the getting-off position.

Figure 5:
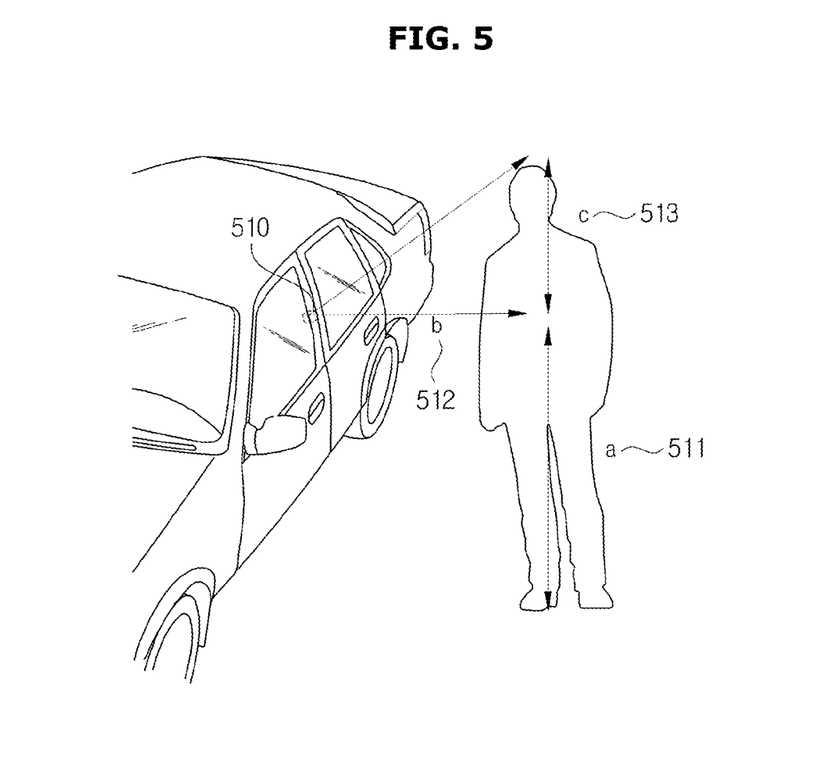
FIG. 5 is a conceptual diagram for explaining height information of a driver identified by the vehicle according to an embodiment.

FIG. 5 is a conceptual diagram for explaining height information of a driver identified by the vehicle according to an embodiment.

Referring to FIG. 5, the controller 300 may identify the driver and perform facial recognition of the driver based on the processing of the image data received from the camera 510. The controller 300 may also identify a distance 512 to the driver based on the processing of the received image data. The distance 512 to the driver may vary depending on the performance of the camera 510, for example.

A mounting height 511 of the camera 510 may be calculated on the basis of vehicle manufacturing information, for example, and may be determined depending on a position where the camera 510 is mounted when the camera 510 is mounted on the vehicle 1.

The controller 300 may calculate angle information between the recognized face or height region of the driver based on the processing of the image data and a plane parallel to the ground at a height a at which the camera 510 is installed. More specifically, the controller 300 may, based on the processing of the image data, calculate angle information based on a table about angles depending on the height region occupied by the driver in the image data obtained by the camera 510 depending on the distance where the driver is recognized. However, the disclosure is not limited thereto.

Accordingly, the controller 300 may identify the height information of the driver based on the calculated angle information.

The height information of the driver may be, for example, calculated through Equation 1 below.

$$H = a + (b \times \tan \theta) \quad \text{[Equation 1]}$$

Herein, H may refer to the identified height information of the driver, the constant a may refer to the same value as the mounting height 511 of the camera 510, h may refer to the distance between the driver and the camera 510 identified by the controller 300, and θ may refer to the angle information between the plane of the height of the camera 510 parallel to the around and the tip of the head of the driver or face recognition position. However, the disclosure is not limited thereto.

Therefore, referring to Equation 1 above, it may be understood that the height information of the driver may be derived by adding the height 511 of the camera 510 and the distance 513 between the tip of the head of the driver and the height of the camera.

Figure 6:
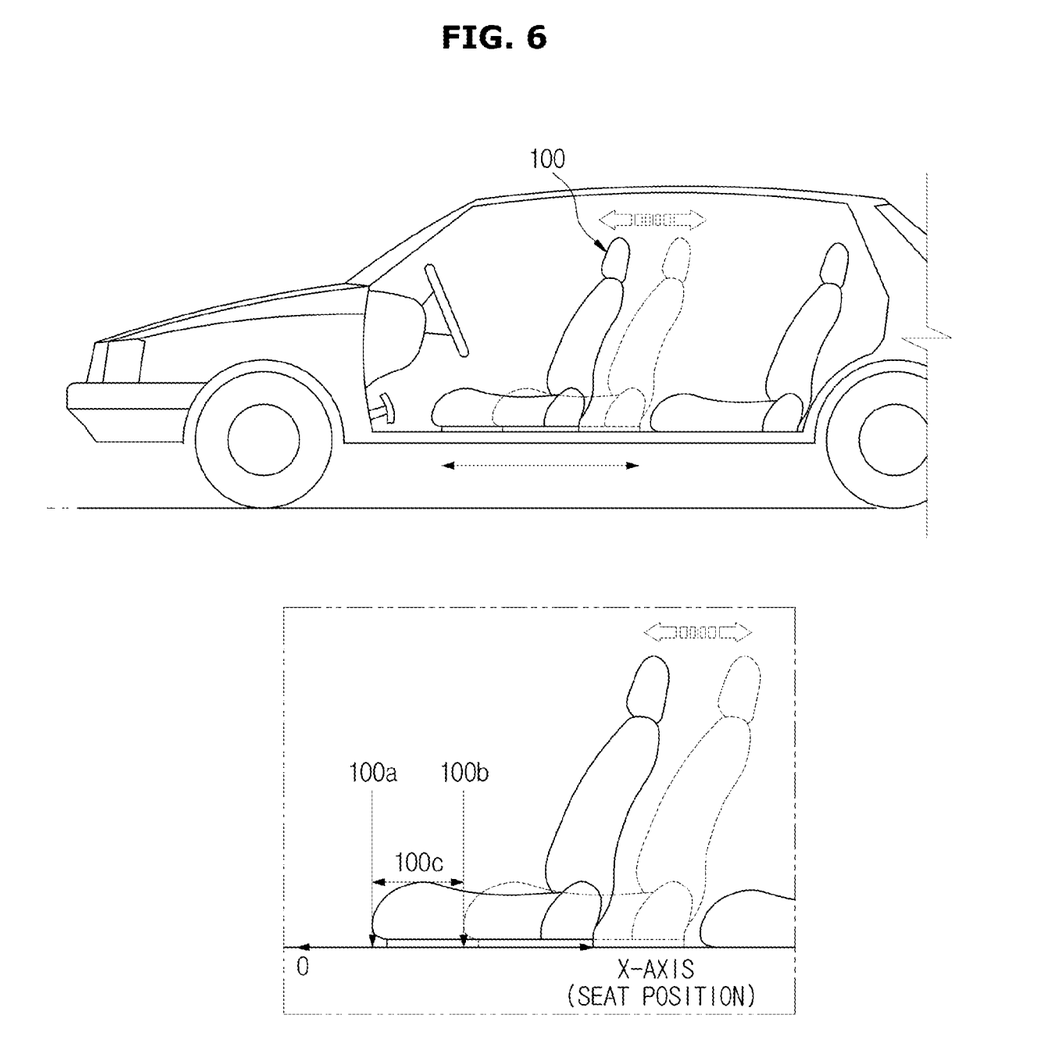
FIG. 6 is a conceptual diagram for explaining a position in getting on and a position in getting off to be provided by the vehicle according to an embodiment.

FIG. 6 is a conceptual diagram for explaining, a position in getting on and a position in getting off to be provided by the vehicle according to an embodiment.

A getting-on position 100a may refer to, for example, the position of the vehicle seat 100 when the driver gets on the vehicle 1 and/or when the vehicle 1 is in a driving state, and a getting-off position 100b may refer to, for example, a position in which the position of the vehicle seat 100 is shifted to the rear for the convenience in getting off of the driver when the vehicle 1 corresponds to the driver getting-off condition.

The controller 300 may identify the getting-on position 100a based on the height information of the driver identified based on the processing of the image data and the height information of the driver identified in the past. The height information of the driver identified in the past may refer to, for example, height information of the driver most recently identified based on a current time point.

More specifically, the controller 300 may compare the identified driver height information with previously identified driver height information, and when the height information is the same or within an error range, may identify existing getting-on position as the getting-on position 100a. The error range may refer to, for example, a case in which a difference between the height information of the driver and the previously identified height information of the driver is less than a preset value, and the preset value is an empirically or experimentally calculated value, and may be a value derived in consideration of convenience of the driver or a value directly changed by the driver.

The controller 300 may compare the identified driver height information with the previously identified driver height information, and when the height information is different or out of the error range, may identify the getting-on position 100a based on the existing getting-on position and the currently identified driver height information. In this case, identifying of the getting-on position may be identified based on Equation 2 below.

$$X = Xp + Xp \times \frac{H - Hp}{Hp} \quad \text{[Equation 2]}$$

Herein, X may refer to the getting-on position 100a, Xp may refer to a recent getting-on position based on the present, H may refer to the identified height information of the driver, and Hp may refer to height information of the driver corresponding to the recent getting-on position based on the present. However, the disclosure is not limited thereto.

More specifically, as illustrated in FIG. 6, an X-axis may refer to the position of the seat. In particular, the origin of the X-axis may refer to, for example, a position in which the vehicle seat 100 is shifted to the front.

Referring to Equation 2 above, for example, in a case where the height information of the driver is 180 cm while the height information of the driver in the past is 178 cm, it may be understood that the controller 300 may identify the getting-on position 100a of the identified driver by about 1.011 times the past getting-on position. That is, it may be understood that as the height of the driver increases compared to the past record, the getting-on position may be shifted to the rear. In addition, it may be understood that the getting-on position may be shifted to the front, depending on a case where the height of the driver becomes smaller compared to the past record. Herein, the numerical values are exemplary values, and the getting-on position 100a may be corrected by further calculating an arbitrary constant.

The controller 300 may identify a getting-off distance 100c based on the height information of the driver. More specifically, the getting-off distance 100c may be identified based on Equation 3 below.

$$L = m + m \times \frac{H - n}{n} \quad \text{[Equation 3]}$$

Herein, L may refer to the getting-off distance 100c, m and n may be numerical values inputted arbitrarily by a user or parameters calculated empirically or experimentally, and H may refer to the identified height information of the driver. However, the disclosure is not limited thereto.

As an example, as values calculated through experimental data, when an average height of an adult male is 170 cm, a default value of 5 cm for the most convenient getting-off distance for the driver may be applied to the parameter, and when the height of the driver is 180 cm, 5 may be applied to m and 170 may be applied to n. Accordingly, the controller 300 may identify the getting-off distance 100c of about 5.3 cm. Therefore, as the height of the identified driver increases, the getting-off distance 100c may increase.

Accordingly, the controller 300 may identify the getting-off distance 100c based on the identified height information of the driver, and may calculate the getting-off position 100b based on the identified getting-on distance 100a and the getting-off distance 100c. More specifically, the getting-off position 100b may be identified by summing the identified getting-on distance 100a and the getting-off distance 100c. However the disclosure is not limited thereto.

When the getting-on position 100a and the getting-off position 100b of the driver are identified and when the vehicle 1 corresponds to the getting-on condition of the driver, the controller 300 may shift the position of the vehicle seat 100 to the getting-on position 100a by generating a control signal for controlling the seat motor 400.

As an example, the getting-on condition of the driver may be a case in which the driver is seated on the vehicle seat 100 through the sensor 520 and/or a case in which the vehicle 1 is started. However, the disclosure is not limited thereto, and the getting-on condition may further include whether the driver is wearing a seat belt.

Referring to FIG. 6, only a case in which the vehicle seat 100 of the vehicle 1 according to an embodiment is controlled in the front-rear direction is exemplified. However, it may be understood that the height information of the driver may also be applied to, for example, control of the height of the driver seat depending on the height of the main body 2 of the vehicle 1.

More specifically, because vertical widths of the doors 71 and 72 are limited when the vehicle seat 100 is high, it may cause inconvenience to the driver when the driver gets off. Accordingly, it may be understood that not only the getting-off position 100b described above as an example is applied to the getting-off position, but also the height may be set to be low, and not only the getting-on position 100a described above as an example is applied to the getting-on position, but also the height may be stored.

Hereinafter, when the driver of the vehicle 1 according to an embodiment manipulates the position of the vehicle seat 100 through the input device 200, determining whether the manipulation may correspond to an intention of the driver and readjusting of the getting-on position will be described in detail.

Specifically, a conventional seat memory system may store the getting-on position and/or getting-off position of the vehicle based on the manipulation when the position of the seat is manipulated through the input device, regardless of whether the position of the seat is in the getting-on position or the getting-off position, thereby adjusting the position of the seat to wrong getting-on position and getting-off position, which may cause inconvenience of re-manipulation and suspicion of malfunction to the driver.

In order to solve the above problems, the controller 300 included in the vehicle 1 according to an embodiment may, when the driver manipulates the vehicle seat 100 through the input device 200, obtain the position of the vehicle seat 100 shifted by the manipulation from the sensor 520.

The controller 300 may also determine whether to identify the seat position shifted depending on the manipulation of the driver as the getting-on position 100a based on the position of the vehicle seat 100 identified from the sensor 520 and the existing getting-on positions stored in the memory 320. This may be to more accurately identify the intention of the driver by considering an average value of the getting-on positions identified in the past, learning information about the adaptive getting-on position suitable for the driver and comparing the information with the current position. However, the disclosure is not limited thereto.

More specifically, the controller 300 may compare a difference between the average value of the existing getting-on positions stored in the memory 320 and the current position of the vehicle seat 100 with the identified getting-off distance 100c and determine whether to identify the current position of the vehicle seat 100 as the getting-on position 100a.

That is, the controller 300 may identify the current position of the vehicle seat 100 as the getting-on position 100a in response to a case where the difference between the average value of the existing getting-on positions and the position of the vehicle seat 100 is smaller than the identified getting-off distance 100c, which corresponds to the case where the current position of the vehicle seat 100 compared to the average value does not differ by more than the getting-off distance.

The controller 300 may also determine whether to identify the position of the vehicle seat 100 as the getting-on position 100a based on whether the vehicle 1 corresponds to the getting-off condition of the driver in response to a case where the difference between the average value of the existing getting-on positions and the position of the vehicle seat 100 is larger than the identified getting-off distance 100c, which corresponds to a case where the distance to the normally learned (stored) getting-on positions is large.

More specifically, because the case where the difference between the average value of the existing getting-on positions and the position of the vehicle seat 100 is larger than the identified getting-off distance 100c corresponds to an unusual position of the vehicle seat 100, the controller 300 may identify the getting-on position 100a based on whether the unusual position corresponds to the getting-off condition of the driver of the vehicle 1 in order to identify determine the intention of the driver.

The driver getting-off condition may, for example, correspond to at least one of the cases in which the ignition of the vehicle 1 is turned off, the door 71 or 72 of the vehicle 1 is opened, and the seat belt of the vehicle 1 is released. However, the disclosure is not limited thereto.

Accordingly, when the difference between the average value of the existing getting-on positions and the position of the vehicle seat 100 is larger than the identified getting-off distance 100c, the controller 300 may identify the existing getting-on position rather than the current position of the vehicle seat 100 as the getting-on position 100a in response to the vehicle 1 corresponding to the driver getting-off condition. On the contrary, in response to the vehicle 1 not corresponding to the driver getting-off condition, the controller 300 may identify the current position of the vehicle seat 100 as the getting-on position 100a.

Accordingly, the controller 300 may identify the getting-on position 100a by determining the intention of the user based on the driver getting-off condition and the comparison with the current position of the vehicle seat 100 and the average value of the existing getting-on positions.

Although the above has been mainly described for controlling the vehicle seat 100 based on the camera 510 installed toward the outer side of the driver seat 110 of the vehicle 1, it may be understood that the above description may be equally applied to an occupant of the passenger seat 120 by further including an additional camera installed toward an outer side of the passenger seat 120. In addition, it may be understood that the above description is also applicable to the rear seat of the vehicle 1.

Figure 7:
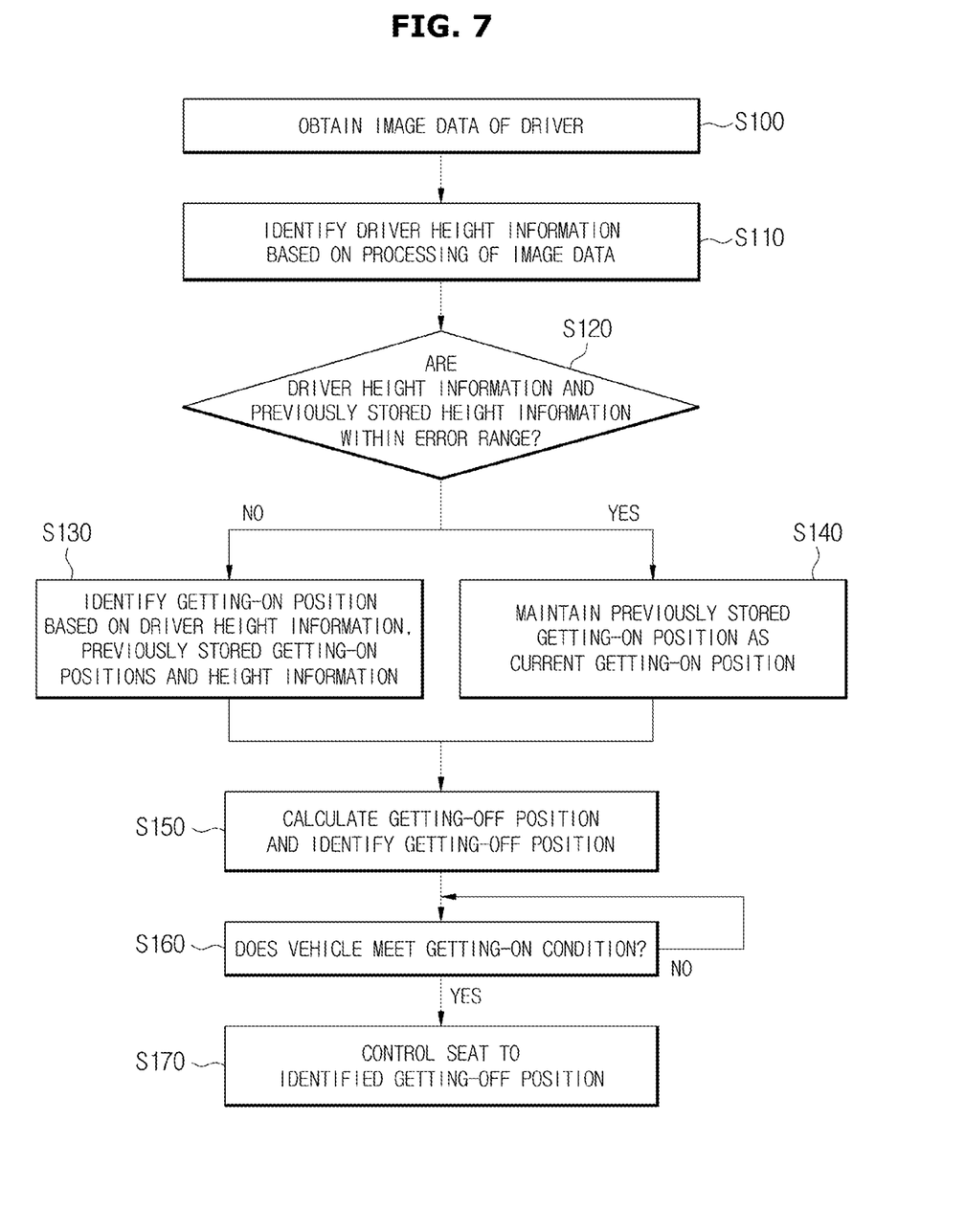
FIG. 7 is a flowchart illustrating a vehicle control method according to an embodiment.
Figure 8:
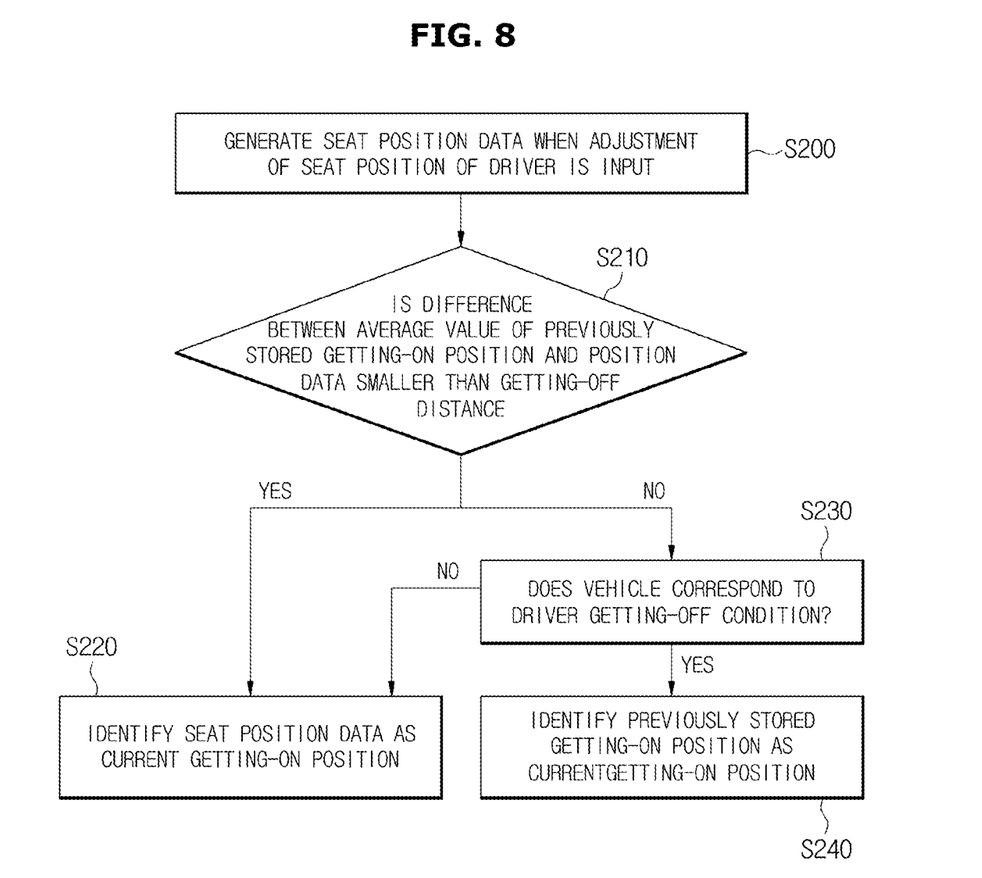
FIG. 8 is a flowchart illustrating the vehicle control method according to an embodiment.

FIGS. 7 and 8 are flowcharts illustrating a vehicle control method according to an embodiment.

A vehicle control method illustrated in FIGS. 7 and 8 may be performed by the vehicle 1 described above. Accordingly, although omitted below, the contents described with respect to the vehicle 1 above may be equally applied to the vehicle control method.

Referring to FIG. 7, the vehicle 1 may obtain image data of the driver (S100).

The vehicle 1 may also identify the driver height information based on the processing of the image data (S110).

The vehicle 1 may also determine whether the identified driver height information and previously stored height information are within an error range (S120).

The vehicle 1 may also identify the getting-on position 100a based on the identified driver height information, the previously stored getting-on positions and height information in response to the identified driver height information and the previously stored height information not being within the error range (S130).

The vehicle 1 may also identify the previously stored getting-on position as the current getting-on position 100a in response to the identified driver height information and the previously stored height information being within an error range (S140).

The vehicle 1 may also calculate the getting-off distance 100c based on the identified driver height information, and may identify the getting-off position 100b based on the getting-off distance 100c and the identified getting-on position 100a (S150).

The vehicle 1 may also determine whether the vehicle corresponds to the driver getting-on condition (S160).

The vehicle 1 may also control the vehicle seat 100 to the identified getting-on position 100a in response to corresponding to the driver getting-on condition (S170).

Referring to FIG. 8, the vehicle 1 may generate position data including the position of the vehicle seat 100 through the sensor 520 when the position adjustment of the vehicle seat 100 of the driver is input through the input device 200 (S200).

The vehicle 1 may also determine whether a difference between the average value of the previously stored getting-on positions and the position data including the position of the vehicle seat 100 is smaller than the getting-off distance 100c (S210).

The vehicle 1 may also identify the current position of the vehicle seat 100 as the getting-on position 100a in response to the difference between the average value of the previously stored getting-on positions and the position data including the position of the vehicle seat 100 being smaller than the getting-off distance 100c (S220).

The vehicle 1 may also determine whether the vehicle 1 corresponds to the driver getting-off condition in response to the difference between the average value of the previously stored getting-on positions and the position data including the position of the vehicle seat 100 being larger than the getting-off distance 100c (S230).

The vehicle 1 may also identify the previously stored getting-on position as the current getting-on position 100a in response to the vehicle 1 corresponding to the driver getting-off condition (S240).

The vehicle 1 may also identify the current position of the vehicle seat 100 as the getting-on position 100a in response to the vehicle 1 not corresponding to the driver getting-off condition (S220).

As is apparent from the above, a vehicle and a control method thereof according to an embodiment can adjust a seat position in consideration of the body type of a driver, and identify seat positions in getting on and off by determining whether the adjustment of seat position matches an intention of the driver, thereby providing accurate the seat positions in getting on and off and further increasing the convenience of the driver.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A vehicle comprising:
   a vehicle seat;
   a sensing device comprising a camera provided to obtain image data toward an outer lateral direction of a driver seat of the vehicle;
   a seat motor provided to implement a movement comprising at least one of folding, reclining, sliding and rotating of the vehicle seat; and
   a controller comprising a processor and a memory provided to process the image data,
   wherein the controller is configured to:
   identify height information of a driver based on processing of the image data,
   identify a getting-on position based on the height information of the driver and existing height information stored in the memory and control the seat motor to shift the vehicle seat to the identified getting-on position, and
   identify a getting-off position based on the identified getting-on position and the height information of the driver and controls the seat motor to shift the vehicle seat to the identified getting-off position.

2. The vehicle according to claim 1, wherein
   the identifying of the getting-off position comprises calculating a getting-off distance based on the height information of the driver and identifying the getting-off position based on the getting-off distance and the identified getting-on position.

3. The vehicle according to claim 2, wherein
   the sensing device further comprises a sensor provided to detect whether the driver is seated on the vehicle seat, and
   the controller controls the seat motor to shift the vehicle seat to the identified getting-on position when it is identified that the driver is seated on the vehicle seat.

4. The vehicle according to claim 2, further comprising an input device provided to adjust the position of the vehicle seat,
   wherein the sensing device further generates position data comprising the position of the vehicle seat, and
   the controller, when a position manipulation of the vehicle seat is received from the input device, is further configured to determine whether to identify the position of the vehicle seat as the getting-on position based on the position data of the vehicle seat depending on the position manipulation and existing getting-on positions stored in the memory.

5. The vehicle according to claim 4, wherein
   the controller is further configured to identify the position of the vehicle seat as the getting-on position in response to a case where a difference between an average value of the existing getting-on positions stored in the memory and the position of the vehicle seat is smaller than the getting-off distance.

6. The vehicle according to claim 4, wherein
   the controller is further configured to determine whether to identify the position of the vehicle seat as the getting-on position based on whether the vehicle corresponds to a driver getting-off condition in response to a case where a difference between an average value of the existing getting-on positions stored in the memory and the position of the vehicle seat is larger than the getting-off distance.

7. The vehicle according to claim 6, wherein
   the controller is further configured to identify one of the existing getting-on positions as the getting-on position in response to the vehicle corresponding to the driver getting-off condition.

8. The vehicle according to claim 1, wherein
   the controller is further configured to identify drivers getting on the vehicle based on the processing of the image data, and stores height information and the identified getting-on position for each of the identified drivers.

9. The vehicle according to claim 8, wherein
   the controller is further configured to generate the getting-on positions as metadata for time depending on the identified drivers.

10. A vehicle control method comprising:
    obtaining image data toward an outer lateral direction of a driver seat of a vehicle by a camera;
    identifying height information of a driver based on processing of the image data;
    identifying a getting-on position based on the height information of the driver and existing height information stored in the memory;
    controlling a seat motor to shift a vehicle seat to the identified getting-on position;
    identifying a getting-off position based on the identified getting-on position and the height information of the driver; and
    controlling the seat motor to shift the vehicle seat to the identified getting-off position.

11. The vehicle control method according to claim 10, wherein
    the identifying of the getting-off position comprises calculating a getting-off distance based on the height information of the driver and identifying the getting-off position based on the getting-off distance and the identified getting-on position.

12. The vehicle control method according to claim 11, wherein the controlling comprises controlling the seat motor to shift the vehicle seat to the identified getting-on position when it is identified that the driver is seated on the vehicle seat.

13. The vehicle control method according to claim 11, further comprising
determining, when a position manipulation of the vehicle seat is received, whether to identify the position of the vehicle seat as the getting-on position based on position data of the vehicle seat depending on the position manipulation and existing getting-on positions.

14. The vehicle control method according to claim 13, wherein
the identifying of the getting-on position comprises identifying the position of the vehicle seat as the getting-on position in response to a case where a difference between an average value of the existing getting-on positions and the position of the vehicle seat is smaller than the getting-off distance.

15. The vehicle control method according to claim 13, wherein
the determining comprises determining whether to identify the position of the vehicle seat as the getting-on position based on whether the vehicle corresponds to a driver getting-off condition in response to a case where a difference between an average value of the existing getting-on positions and the position of the vehicle seat is larger than the getting-off distance.

16. The vehicle control method according to claim 15, wherein
the identifying of the getting-on position comprises identifying one of the existing getting-on positions as the getting-on position in response to the vehicle corresponding to the driver getting-off condition.

17. The vehicle control method according to claim 10, further comprising
identifying drivers getting on the vehicle based on the processing of the image data, and storing height information and the identified getting-on position for each of the identified drivers.

18. The vehicle control method according to claim 17, wherein
the storing comprises generating the getting-on positions as metadata for time depending on the identified drivers.

* * * * *